United States Patent
Kato et al.

[11] Patent Number: 5,906,967
[45] Date of Patent: May 25, 1999

[54] ADHESION-FREE FORMING MATERIALS FOR SLIDING PARTS, PAPER SEPARATOR AND DELIVERY ROLLER

[75] Inventors: Masami Kato, Osaka; Taketo Kato, Settu; Masaji Komori, Settu; Tsuyoshi Miyamori, Settu; Tetsuo Shimizu, Settu, all of Japan

[73] Assignee: Daikin Industries, Ltd., Osaka, Japan

[21] Appl. No.: 09/071,165

[22] Filed: May 4, 1998

Related U.S. Application Data

[63] Continuation of application No. 08/744,871, Nov. 8, 1996, abandoned.

[30] Foreign Application Priority Data

Nov. 8, 1995 [JP] Japan .................................. 7-316029

[51] Int. Cl.$^6$ ............................................. C10M 141/04
[52] U.S. Cl. ............................................................ 508/106
[58] Field of Search .............................................. 508/106

[56] References Cited

U.S. PATENT DOCUMENTS

| | | | |
|---|---|---|---|
| 2,975,128 | 3/1961 | Stott | 508/106 |
| 2,998,397 | 8/1961 | Riesing | 508/106 |
| 3,453,208 | 7/1969 | Gallagher et al. | 508/106 |
| 3,652,409 | 3/1972 | Mack et al. | 508/106 |
| 3,879,301 | 4/1975 | Cairns | 508/106 |
| 3,994,814 | 11/1976 | Cairns | 508/106 |
| 4,532,054 | 7/1985 | Johnson | 508/106 |
| 4,724,251 | 2/1988 | Rock | 508/106 |
| 4,945,126 | 7/1990 | Crosby et al. | 508/106 |
| 5,364,682 | 11/1994 | Tanaka et al. | 508/106 |

*Primary Examiner*—Jerry D. Johnson
*Attorney, Agent, or Firm*—Pollock, Vande Sande & Amernick

[57] ABSTRACT

A non-sticking sliding part molding Composition comprising a mixture of a fluororesin and a thermoplastic resin other than fluororesin and a fibrous filler, said mixture and said fibrous filler accounting for 70 to 95 weight % and 5 to 30 weight %, respectively, and said thermoplastic resin other than fluororesin occurring in a proportion of 60 to 100 parts by weight based on t00 parts by weight of said fluororesin. The object is to provide a non-sticking sliding part molding composition which is not only fully possessed of the fundamental properties required of sliding parts but also has a well-balanced assortment of hardness, deflection under load, creep resistance, slidability, moldability, and toner-repellent property, thus surpassing the prior art.

15 Claims, No Drawings

ADHESION-FREE FORMING MATERIALS FOR SLIDING PARTS, PAPER SEPARATOR AND DELIVERY ROLLER

This application is a continuation of Ser. No. 08/744,871, filed Nov. 8, 1996, now abandoned.

TECHNICAL FIELD

The present invention relates to a molding composition for the manufacture of non-sticking sliding parts suitable for OA equipment and a separation pawl and a paper discharge roller for OA equipment as molded from said molding composition.

PRIOR ART

In duplicators and other OA equipment, sliding parts such as separation pawls and paper discharge rollers are employed.

The separation pawl is disposed in juxtaposition with a heating roller so as to insure a positive transport of copying paper without wrapping around the heating roller on emergence from the roller. The paper discharge rollers are equipped on a paper discharge rotating shaft at the outlet to discharge the paper carrying the electostatic latent image toned and heated by the heating roller smoothly from the duplicator unit.

With the increasing complexity of configurations of parts and for improved productivity, many of these sliding parts are being fabricated by injection molding today and the molding materials for these parts are expected to possess certain basic qualities such as dimensional stability and geometric stability.

Furthermore, as fundamental properties, such materials should have low friction properties, high wear resistance, and low potential of attacking associated parts. In addition, because of their adjacency to the heating roller as installed, thermal resistance and geometric stability against heat are required.

Japanese Kokai Publication Sho-61-55674 discloses a separation pawl for duplicator use as molded from a composition comprising a fluororesin, a polyetherketone, and carbon fiber in a specified ratio and having qualities required of sliding parts. This technology is not satisfactory in toner-repellent property, i.e. deposition of the toner on the separation pawl as a cause of soiling the paper upon repeated operation and the ultimate soiling of the paper, as well as in terms of the potential of attacking associated parts, that is to say the property to injure the adjacent roller.

Japanese Kokai Publication Sho-60-47048 discloses that a molding composition available upon addition of potassium titanate whiskers in a specified proportion to a thermoplastic fluororesin is suited for the manufacture of a separation pawl for duplicator use. This pawl is excellent in thermal resistance and toner-repellent property but is still low in hardness and creep resistance so that it is not fully satisfactory in terms of geometric stability.

Japanese Kokai Publication Sho-57-111569 discloses a technology which comprises coating at least the tip portion of a separation pawl with a fluororesin. However, this technology is not fully satisfactory, either, because it requires a surface treatment as an additional step with consequent poor economics and, moreover, the detachment and wear of the coating cannot be avoided.

To overcome the above disadvantages of the prior art, the present invention has for its object to provide a non-sticking sliding part molding composition which is not only fully possessed of the fundamental properties required of sliding parts but also has a well-balanced assortment of hardness, deflection under load, creep resistance, slidability, moidability, and toner-repellent property, thus surpassing the prior art.

SUMMARY OF THE INVENTION

The non-sticking sliding part molding composition of the present invention comprises a mixture of a fluororesin and a thermoplastic resin other than fluororesin and a fibrous filler, said mixture of fluororesin and thermoplastic resin other than fluororesin and said fibrous filler accounting for 70 to 95 weight % and 5 to 30 weight %, respectively, and said thermoplastic resin other than fluororesin occurring in a proportion of 60 to 100 parts by weight based on 100 parts by weight of said fluororesin.

DETAILED DESCRIPTION OF THE INVENTION

The first component of the non-sticking sliding part molding composition of the present invention is a fluororesin.

The fluororesin that can be used is not particularly restricted only if it is a fluorine-containing synthetic material of high molecular weight and, as such, a variety of known polymers can be employed. Thus, polytetrafluoroethylene (PTFE), tetrafluoroethylene-perfluoroalkylvinylether copolymer (PFA), tetrafluoroethylene-hexafluoropropylene copolymer (FEP), tetrafluoroethylene-ethylene copolymer (ETFE), etc. can be typically mentioned. Preferred is PTFE.

The above-mentioned PFA is a copolymer of tetrafluoroethylene with at least one species of the fluoroalkylvinylether of the formula $CF_2=CF-O-Rf$ (wherein Rf represents a fluoroalkyl group of 1 to 10 carbon atoms). The preferred fluoroalkylvinylether is perfluoro(alkylvinylether).

PFA is preferably composed of 99 to 92 weight % of tetrafluoroethylene and 1 to 8 weight % of fluoroalkylvinylether.

FEP is preferably composed of 99 to 80 weight % of tetrafluoroethylene and 1 to 20 weight % of hexafluoropropylene.

ETFE is preferably composed of 90 to 74 weight % of tetrafluoroethylene and 10 to 26 weight % of ethylene.

These fluorine-containing resins may contain other monomer units within the range not adversely affecting the intrinsic properties of tne respective resins. The other monomers mentioned above may for example be tetrafluoroethylene (excluding PEA, FEP, and ETFE), hexafluoropropylene (excluding FEP), perfluoroalkylvinylether (excluding PFA), perfluoroalkylethylene (the alkyl moiety of which contains 1 to 10 carbon atoms), perfluoroalkylallylether (the alkyl moiety of which contains 1 to 10 carbon atoms), and compounds of the formula;

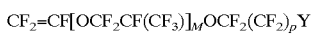

$$CF_2=CF[OCF_2CF(CF_3)]_nOCF_2(CF_2)_pY$$

(wherein Y represents halogen, n represents an integer of 0 to 5, and p represents an integer of 0 to 2). The proportion of said other monomers in the polymer is not larger than 50 weight % and is preferably 0.01 to 45 weight t.

The molecular weight of said fluororesin is not so critical but, in the case of PTFE, its melt viscosity is preferably not greater than $10^7$ poises at 380° C. The above-mentioned species of fluororesin can be used independently or in combination.

The second component of the non-sticking sliding part molding composition of the present invention is a thermoplastic resin other than fluororesin. There is no particular limitation on the kind of thermoplastic resin that can be used. Thus, a variety of known thermoplastic resins can be employed. However, polyphenylene sulfide (PPS), polyetheretherketone, aromatic polyester, thermoplastic polyimide, and polyamideimide are preferred. Particularly preferred is PPS.

The molecular weight of said thermoplastic resin is not so critical. Moreover, these thermoplastic resins can be used independently or in combination.

The third component of the non-sticking sliding part molding composition of the present invention is a fibrous filler. The fibrous filler that can be used is not particularly limited but includes a variety of known fillers such as glass fiber, carbon fiber, graphite fiber, ceramic fiber, rock wool, slag wool, potassium titanate whisker, silicon carbide whisker, sapphire whisker, aluminum borate whisker, wollastonite, copper wire, steel wire, stainless steel wire, silicon carbide fiber, and aromatic polyamide fiber, among others. Use of carbon fiber, which is electrically conductive, helps to prevent generation of electrostatic charges and, hence, results in a further increased toner-repellent property.

The carbon fiber that can be used Includes polyacrylonitrile-based, pitch-based, cellulose-based, and other carbon fibers. For the purposes of the present invention, the diameter of said carbon fiber is preferably 5 to 30 $\mu$m. As to its morphology, a carbon fiber with an aspect ratio of 10 to 300 is preferred for imparting sufficient hardness.

In accordance with the present invention, 5 to 30 weight % of the fibrous filler is added to 70 to 95 weight % of a mixture of said fluororesin and thermoplastic resin other than fluororesin. If the proportion of said fibrous filler is less than 5 weight %, no satisfactory geometrical stability assuring sufficient strength will be obtained. Conversely if the proportion exceeds 30 weight %, the fluidity of the mixture will be so low that sharply-edge parts may hardly be molded. The preferred molding composition comprises 80 to 95 weight % of said mixture of fluororesin and thermoplastic resin other than fluororesin and 5 to 20 weight % of said fibrous filler.

In the present invention, 60 to 100 parts by weight of said thermoplastic resin other than fluororesin is mixed with 100 parts by weight of said fluororesin. Thus, the thermoplastic resin other than fluororesin is invariably used in a proportion equal to or smaller than the proportion of said fluororesin and is never below 60 parts by weight. This is a characteristic of the present invention.

If the amount of said thermoplastic resin other than fluororesin Is smaller than 60 parts by weight, the fluidity of the mixture will be too low for successful formation of sharply-edge parts in the molding process. On the other hand, if its amount exceeds 100 parts by weight, the product pawl, for instance, tends to injure the adjacent roller and be poor in the expression of toner-repellent property, thus interfering with accomplishment of the object of the invention.

The term "toner-repellent property" as used throughout this specification not only means that, when the end product is a separation pawl, for instance, it is less receptive to toner particles but also means that the deposited toner can be easily removed, that is to say a virtual freedom from stack of the toner. The toner-repellent property also means the property to prevent from fouling of the copy due to the incremental deposition of toner particles electrostatically transferred to copying paper to the separation pawl in the course of repeated toning and subsequent transfer of the toner particles from the pawl to the background area other than the image area of following paper.

The non-sticking sliding part molding composition of the present invention is characterized in that it has a Shore hardness (HsD) value of 70 to 80 and a creep (total deformation) value of not greater than 3%. By these features, the sliding parts for OA equipment as molded from the non-sticking sliding part molding composition of the present invention show sufficient hardness, satisfactory deflection under load, and high creep resistance.

There in no particular restriction to the technology that can be used for producing the non-sticking sliding part molding composition of the present invention. Thus, any of the known mixing and kneading methods can be employed. For example, the composition can be produced by premixing the above-mentioned first and second components in a mixer, a tumbler, or the like machine, then adding the third component, and melt-kneading the whole mixture by means of, for example, a twin screw extruder or the like machine. As an alternative, the objective molding composition can be obtained by mixing all the components in the specified proportions and melt-kneading the mixture.

Unless the object of the invention is dishonored, the non-sticking sliding part molding composition of the present invention may contain a variety of additives in addition to the above-mentioned essential components. Among such other additives are one or more than one member of the antioxidant, thermal stabilizer, ultraviolet absorber, lubricant, mold-releasing agent, dye, pigment, flame retardant, auxiliary flame retardant, antistatic agent, etc. which are known per se.

The non-sticking sliding part molding composition of the present invention displays its unique effects particularly in such applications as separation pawls and paper discharge rollers in OA equipments such as duplicators, printers, and so forth. Moreover, this molding composition is especially useful even when the copying paper is OHP or the like which is of low toner fixation potential. However, uses for the non-sticking sliding part molding composition of the invention are not limited to the above-mentioned parts but the composition can be successfully used for the manufacture of parts required to be wear-resistant, such as the ink delivery nozzle of an ink jet printer.

There is no particular limitation on the method of molding the non-sticking sliding part molding composition of the invention into sliding parts for OA equipment. An exemplary preferred method comprises molding the composition by means of a known injection molding machine at a cylinder temperature of 200 to 400° C. and a mold temperature of about 100 to 200° C. It is also possible to prepare an intermediate product or blank by compression molding or extrusion and, then, finish-machine the blank.

Having the above-described Constitution, the non-sticking sliding part molding composition of the present invention provides very useful sliding parts for OA equipment which possess not only the basic performance characteristics required of sliding parts in general but also good moldability with neat reproduction of even acute geometries and toner-repellent property.

EXAMPLES

The following examples are intended to describe the present invention in further detail and should by no means be construed as defining the scope of the invention.

Example 1

Using a mixer, 36 weight % of PPS (manufactured by Tohpren. Co., m. p. 285° C.) and 44 weight t of lowmolecular-weight PTFE (manufactured by Daikin Industries Ltd., L-5F, melt viscosity at 380° C.=$10^5$ poises) were pre-mixed. Then, 20 weight % of carbon fiber (manufactured by Kureha Chemical Industry Co., Ltd.) was added and using a twin screw extruder (manufactured by Ikegai Co., PCM46), the whole mixture was compounded at a cylinder temperature of 280 to 320° C. to prepare a pelletized mixture. The pellets were then injection-molded using an injection molding machine (manufactured by Sumitomo Heavy Industries, Ltd., SG50) at a cylinder temperature of 270 to 320° C. and a mold temperature of 140° C. to provide testpieces. Using these testpieces, the following evaluations were made. Separately, the above pellets were subjected to determination of flow length by injection molding using a bar flow mold.

Evaluation Methods

1. Hardness

Using the durometer (Type D) manufactured by Yasuda Seiki Seisakusho, Ltd., the hardness of the testpiece was measured in accordance with ASTM D636.

2. Deflection Temperature Under Load

Using the heat distortion tester manufactured by Yasuda Seiki Seisakusho, Ltd., the deflection temperature was measured using a load of 18.6 kg/cm$^2$ in accordance with ASTM D648.

3. Compression Creep

Using the constant load tester manufactured by Toyo Seiki Seisaku-sho, Ltd., the compression creep was measured under the conditions of 2000 psi., 24° C., and 24 hours in accordance with ASTM D621-51.

4. Critical PV Value

Using the Suzuki-Matzubara frictional wear tester manufactured by Orientec, the load was increased by 2.5 kg/cm$^2$ per kilometer of sliding distance under the following fixed conditions and the value immediately prior to a sudden progression of wear was recorded.

Speed: 100 m/min.

Associated piece: ADC12 (aluminum die-cast 12)

Atmosphere: dry

5. Coefficient of Friction

Using the Su2uki-Matsubara frictional wear tester manufactured by Orientec, the coefficient of friction was determined under the following conditions.

Load: 5 kg/cm2

Speed: 60 m/min.

Sliding distance; 100 km

Associated piece: ADC12 (aluminum die-cast 12)

Atmosphere: dry

6. Flow length

Using an injection molding machine manufactured by The Japan Steel Works, Ltd., Injection N-65, the bar flow characteristic (thickness 1 mm) was evaluated at a cylinder temperature of 280 to 320° C. and a mold temperature of 140° C.

7. Low toner pickup characteristic

In an atmosphere of 150 to 200° C., the testpiece was forced into a pile of toner particles and taken out and the degree of deposit of toner particles on the testpiece was evaluated by the naked eye according to the following evaluation schema.

⊚: No toner deposit at all

○: A slight toner deposit

Δ: A minor toner deposit

X: A marked toner deposit

The results of the above evaluations are presented in Table 1.

Example 2 and Comparative Examples 1 and 2

Except that PPS, PTFE, and carbon fiber were used in different ratios, testpieces were prepared by the procedure described in Example 1 and evaluated as in Example 1. The results are presented in Table 1.

Comparative Example 3

The universal sliding part grade PPS (manufactured by Phillips, tradename Lytron RJ-4315) was used for testpieces. The results are shown in Table 1.

TABLE 1

|  |  | Example | | Comparative Example | | |
|---|---|---|---|---|---|---|
|  |  | 1 | 2 | 1 | 2 | 3 |
| Composition | PPS (wt. %) | 35 | 40 | 30 | 50 | 55 |
|  | PTFE (wt. %) | 45 | 50 | 60 | 40 | 15 |
|  | Carbon fiber (wt. %) | 20 | 10 | 10 | 10 | 30 |
| Evaluation | Hardness (HsD) | 77 | 75 | 71 | 81 | 83 |
|  | Deflection temperature under load (° C.) | 240 | 200 | 110 | 200 | 250 |
|  | Compression creep (%) | 1.7 | 2.0 | 8.0 | 2.0 | 1.5 |
|  | Critical PV (kgf · Km) | 1000 | 750 | 500 | 750 | 500 |
|  | Coefficient of friction, | 0.01 | 0.15 | — | 0.35 | Abnormal |

TABLE 1-continued

|  | Example | | Comparative Example | | |
|---|---|---|---|---|---|
|  | 1 | 2 | 1 | 2 | 3 |
| testpiece (mm³/kg · km) |  |  |  |  | wear |
| Coefficient of friction, associated piece (mm³/kg · km) | ≦0.01 | ≦0.01 | — | 0.03 | Abnormal wear |
| Flow length (mm) | 55 | 80 | 25 | 90 | 80 |
| toner-repellent property (appearance) | ○ | ○ | ◎ | Δ | X |

In Table 1, "abnormal wear" means an abrupt progression of wear during the sliding test.

It is apparent from Table 1 that, in Comparative Example 1 where the proportion of fluororesin is too large, creep resistance is low, compression creep is increased, critical PV is low, and the flow length is small, thus indicating poor moldability. In Comparative Example 2 where the proportion of the thermoplastic resin other than fluororesin is too large, the wear of the testpiece and of the associated piece is remarkable and the testpiece is poor in toner-repellent property, thus failing to accomplish the object of the invention. In the case of the universal sliding part grade PPS used in Comparative Example 3, where the proportion of fluororesin is too small, the wear of the testpiece and of the associated piece and toner-repellent property are fairly poor, thus failing to accomplish the object of the present invention.

We claim:

1. A non-sticking sliding part molding composition produced by melt-kneading a mixture of at least one fluororesin provided that when said fuororesin is polytetrafluoroethylene its melt viscosity is not greater than $10^7$ poise at 380° C. and thermoplastic resins other than fluororesin and a fibrous filler, said mixture of fluororesin and thermoplastic resin other than fluororesin and said fibrous filler accounting for 70 to 95 weight % and 5 to 30 weight %, respectively, and said thermoplastic resin other than fluororesin occurring in a proportion of 60 to 100 parts by weight based on 100 parts by weight of said fluororesin.

2. The non-sticking sliding part molding composition according to claim 1 comprising 80 to 95 weight % of said mixture of fluororesin and thermoplastic resin other than fluororesin and 5 to 20 weight % of said fibrous filler.

3. The non-sticking sliding part molding composition according to claim 1 wherein said fluororesin is at least one member selected from the group consisting of polytetrafluoroethylene having a melt viscosity of not greater than $10^7$ poise at 380° C., tetrafluoroethylene-perfluoroalkylvinylether copolymer, tetrafluoroethylene-hexafluoropropylene copolymer, and tetrafluoroethylene-ethylene copolymer.

4. The non-sticking sliding part molding composition according to claim 1 wherein said thermoplastic resin other than fluororesln Is at least one member selected from the group consisting of polyphenyl.ene sulfide, polyetheretherketone, aromatic polyester, thermoplastic polyimide, and polyamideimide.

5. The non-sticking sliding part molding composition according to claim 1 wherein said fibrous filler is carbon fiber.

6. The non-sticking sliding part molding composition according to claim 1 which has a Shore hardness (HsD) value of 70 to 80 and a creep (total deformation) value measured under the conditions of 2000 psi., 24° C., and 24 hours of not greater than 3%.

7. A separation pawl for office automation equipment as molded from the non-sticking sliding part molding composition according to claim 1.

8. A paper discharge roller for office automation equipment as molded from the non-sticking sliding part molding composition according to claim 1.

9. A process for producing a non-sliding part molding composition, which comprises melt-kneading a mixture of at least one fluororesin provided that when said fluororesin is polytetrafluoroethylene its melt viscosity is not greater than $10^7$ poise at 380° C., and thermoplastic resins other than fluororesin and a fibrous filler, said mixture of fluororesin and thermoplastic resin other than fluororesin and said fibrous filler accounting for 70 to 95 weight % and 5 to 30 weight % respectively, and said thermoplastic resin other than fluororesin occurring in a proportion of 60 to 100 parts by weight based on 100 parts by weight of said fluororesin.

10. A non-sticking sliding part molding composition produced by melt-kneading a mixture of polytetrafluoroethylene having a melt viscosity of not greater than $10^7$ poise at 380° C. and a thermoplastic resin other than fluororesin and a fibrous filler, said mixture of polytetrafluoroethylene and a thermoplastic resin other than fluororesin and said fibrous filler accounting for 70 to 95 weight % and 5 to 30 weight %, respectively, and said thermoplastic resin other than fluororesin occurring in a proportion of 60 to 100 parts by weight based on 100 parts by weight of polytetrafluoroethylene.

11. The non-sticking sliding part molding composition according to claim 10 wherein the thermoplastic resin other than fluororesin is polyphenylene sulfide.

12. A separation pawl for office automation equipment which is molded from the non-sticking sliding part molding composition according to claim 10.

13. A paper discharge roller for office automation equipment which is molded from the non-sticking sliding part molding composition according to claim 10.

14. A separation pawl for duplicator or printer which is molded from the non-sticking sliding part molding composition according to claim 10.

15. A paper discharge roller for duplicator or printer which is molded from the non-sticking sliding part molding composition according to claim 10.

* * * * *